United States Patent [19]

Jain et al.

[11] Patent Number: 4,732,580
[45] Date of Patent: Mar. 22, 1988

[54] ARGON AND NITROGEN COPRODUCTION PROCESS

[75] Inventors: Ravi Jain, North Plainfield; Steven L. Lerner, Berkeley Heights; Robert A. Mostello, Somerville; Donald L. MacLean, Annandale, all of N.J.

[73] Assignee: The BOC Group, Inc., Montvale, N.J.

[21] Appl. No.: 914,096

[22] Filed: Oct. 1, 1986

[51] Int. Cl.$^4$ .............................................. B01D 53/04
[52] U.S. Cl. .................................... 55/26; 55/27; 55/31; 55/58; 55/62; 55/66; 55/75; 62/18
[58] Field of Search ........................................ 55/25–27, 55/31, 58, 62, 66, 68, 74, 75; 62/17, 18

[56] References Cited

U.S. PATENT DOCUMENTS

| | | | |
|---|---|---|---|
| 2,893,512 | 7/1959 | Armond | 55/66 X |
| 3,063,217 | 11/1962 | Armond et al. | 55/66 X |
| 3,173,778 | 3/1965 | Gaumer, Jr. | 62/18 X |
| 3,928,004 | 12/1975 | Bligh et al. | 55/66 |
| 3,967,464 | 7/1976 | Cormier et al. | 62/18 X |
| 3,996,028 | 12/1976 | Golovko et al. | 55/66 X |
| 4,055,961 | 11/1977 | Admiraal | 55/66 X |
| 4,144,038 | 3/1979 | Armond | 55/66 X |
| 4,239,509 | 12/1980 | Bligh et al. | 55/66 |
| 4,372,764 | 2/1983 | Theobald | 62/18 X |
| 4,421,530 | 12/1983 | Dalton, Jr. et al. | 55/62 X |
| 4,421,531 | 12/1983 | Dalton, Jr. et al. | 55/62 X |
| 4,439,213 | 3/1984 | Frey et al. | 55/62 X |
| 4,477,265 | 10/1984 | Kumar et al. | 55/66 X |
| 4,494,966 | 1/1985 | Umeki | 55/62 X |
| 4,529,412 | 7/1985 | Hayashi et al. | 55/66 X |

FOREIGN PATENT DOCUMENTS

| | | | |
|---|---|---|---|
| 61092 | 5/1979 | Japan | 55/66 |
| 167411 | 10/1983 | Japan | 55/66 |
| 38384 | 2/1986 | Japan | 55/66 |

Primary Examiner—Robert Spitzer
Attorney, Agent, or Firm—R. Hain Swope; Chris P. Konkol; Larry R. Cassett

[57] ABSTRACT

Argon and nitrogen are produced in a basic two step process. In a first step, oxygen is removed from a compressed air feed using low temperature PSA (pressure swing adsorption). In the second step, argon and nitrogen mixture is separated by cryogenic distillation. The process yields crude liquid argon and very high purity gaseous nitrogen.

25 Claims, 1 Drawing Figure

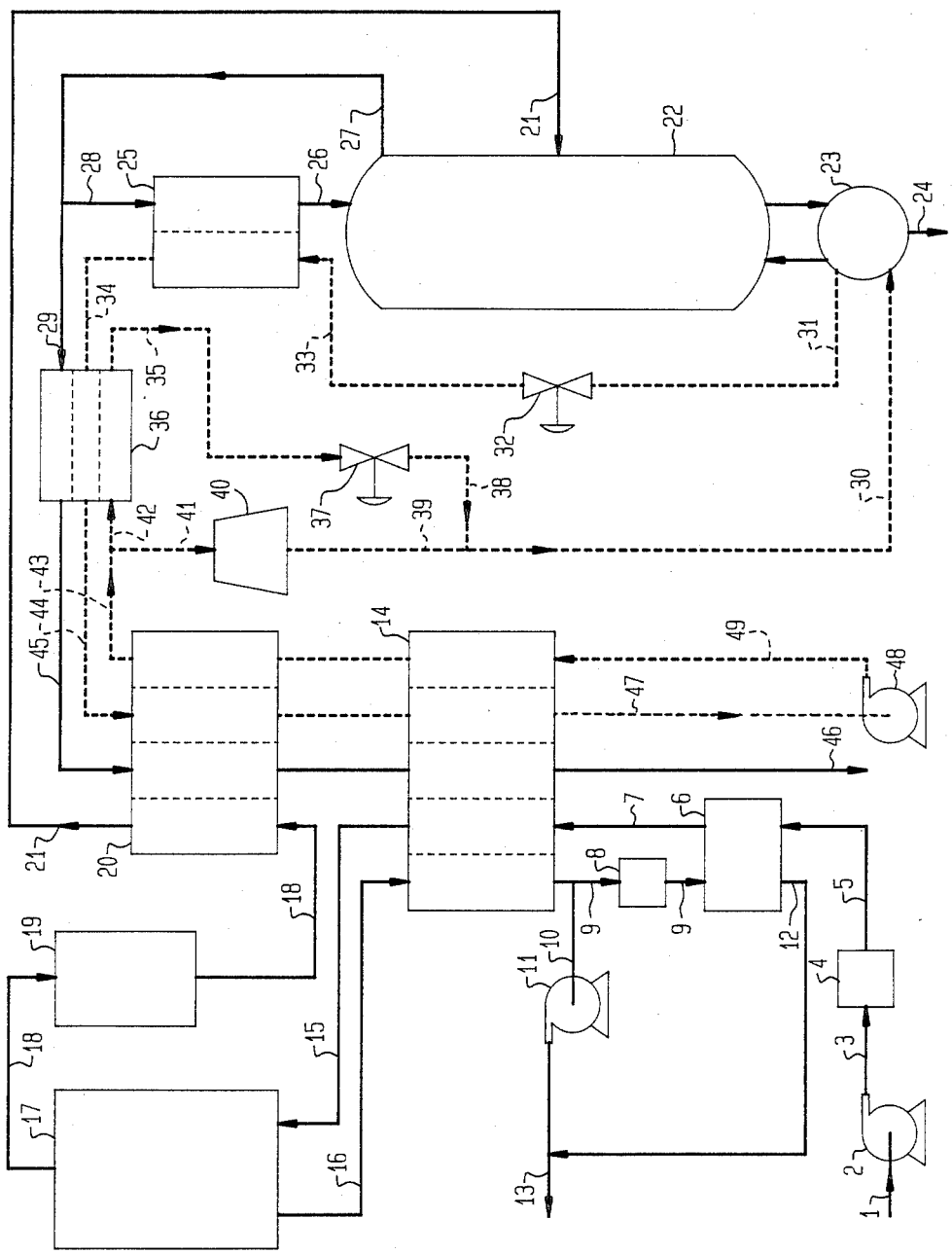

ARGON AND NITROGEN COPRODUCTION PROCESS

The present invention is directed to a process for the production of argon and nitrogen (separately) from air.

BACKGROUND OF THE INVENTION

Current and projected argon demand currently exceeds the amount of argon available as a product of conventional air separation units (ASUs). Accordingly, Applicants have undertaken a search for new sources of argon and the development of new and economical methods of producing argon.

The present invention utilizes pressure swing adsorption at low temperatures to separate argon and nitrogen from air and subsequently utilizes cryogenic distillation to separate argon and nitrogen. This approach avoids the production of oxygen while producing both nitrogen and argon.

OBJECTS OF THE INVENTION

An object of the present invention is to produce argon and nitrogen from air without simultaneously producing oxygen.

A further object of the present invention is the coproduction of argon and nitrogen which is advantageous compared to the production of nitrogen via a nitrogen generator, or to the production of solely argon and nitrogen by an air separation unit (ASU).

Yet a further object of the present invention is to coproduce nitrogen and argon utilizing a low temperature PSA separation that provides a high yield of nitrogen and argon.

The invention will be more clearly understood by reference to the following description of exemplary embodiments thereof in conjunction with the following drawing in which the sole FIGURE is a diagramatic view of apparatus for performing the process according to the invention.

BRIEF DESCRIPTION OF THE DRAWINGS

The Sole FIGURE is a schematic diagram of a process for the coproduction of argon and nitrogen according to the present invention.

DETAILED DESCRIPTION OF THE INVENTION

Referring to the sole FIGURE, a feed air stream 1 is passed to a compressor 2, thereby producing an air stream 3 at an elevated pressure. The air is normally compressed to a pressure of 30–60 psig depending on the pressure at which the nitrogen product in stream 46 is desired. If the product nitrogen is needed at a pressure higher than 50 psig, a nitrogen product compressor (not shown) is optional. Compressed air stream 3 exiting compressor 2 is cooled in an after-cooler 4 to condense some of the contained water. Carbon dioxide and remaining water in the cooled air stream 5 are removed by conventional purification means such as a molecular sieve pre-purification unit 6 containing commercially available 13× molecular sieve. In practice, two adsorbent beds are used to allow continuous operation, wherein the bed not used for purification undergoes thermal regeneration as later described. Having been depleted of carbon dioxide and water, air stream 7 enters a first heat exchanger 14, wherein the air is cooled against returning process streams to be later described.

Exiting the heat exchanger 14 at a reduced temperature, the cold air stream 15 is introduced into a pressure swing adsorption unit (PSA unit) 17 containing two or more beds of carbon molecular sieve, as more fully described later.

The PSA unit 17 produces a PSA product stream 18 comprising a mixture of nitrogen and argon and a small amount of oxygen, typically 0.05 to 0.1%, and a PSA waste stream 16 enriched in oxygen.

The PSA unit 17 comprises a plurality of adsorption beds each of which contains a suitable adsorbent. The adsorbent must have a greater selectivity for both argon and nitrogen than oxygen. Carbon molecular sieve (CMS) is the preferred adsorbent and in particular the CMS commercially available from Kuraray Chemical Company in Japan. Alternatively, carbon molecular sieve manufactured by Bergbau-Forschung in West Germany is suitable. The PSA operates at a temperature depending on the sieve material used, the aim being to maximize the nitrogen and argon yields while keeping oxygen to a very low level in the PSA product. For the PSA embodiment employing Kuraray CMS, an operational temperature range of 60° F. to −40° F. is suitable, with a range of 10° F. to −10° F. being the preferred range for the coproduction process. At a temperature of 0° F., the Kuraray CMS was found to give a nitrogen yield of 55% and an argon yield of 70% in a product containing 0.1% $O_2$, as more fully described later.

The PSA unit 17 is regenerated periodically in two steps. The pressure of each bed is alternatively reduced to atmospheric pressure and then further reduced to an appropriate vacuum level using a vacuum pump 11. The pressure and vacuum portions of the waste stream 16 are segregated and are appropriately utilized as discussed below.

The PSA waste stream 16 is returned to the first heat exchanger 14, where its refrigeration value is recovered. The atmospheric pressure portion of the PSA waste may be warmed in a heater 8 and used to regenerate the bed not undergoing adsorption in the molecular sieve pre-purification unit 6 while stream 10, the vacuum portion of the PSA waste, is drawn through the vacuum pump 11 as discussed above. After being passed through the molecular sieve pre-purification unit 6, the heated waste stream picks up the carbon dioxide and water previously adsorbed and exits the molecular sieve pre-purification unit as stream 12. This waste stream 12 and the waste stream 10 exiting the vacuum pump 11 may be combined and vented directly to atmosphere as stream 13.

The PSA product stream 18 is passed through the PSA product receiver 19 in order to minimize flowrate fluctuations encountered during bed switch over in the PSA unit 17. Exiting the product receiver 19, the gaseous mixture is subsequently passed to a second heat exchanger 20, where it is cooled close to its dew point against a returning nitrogen product stream 45. The cooled stream 21 is then introduced into distillation column 22 wherein the mixture of nitrogen, argon, and a trace amount of oxygen is separated into pure nitrogen and crude argon products.

The refrigeration for the distillation column 22 may be provided by an external heat-pump circuit as shown by dotted lines in the sole FIGURE. A low pressure heat-pump fluid 47 which may be a mixture of argon and nitrogen, is compressed in compressor 48 and exits at an appropriate pressure as more fully described later. Compressed heat-pump fluid stream 49 is then successively cooled in first heat exchanger 14 and second heat exchanger 20 against the cold heat-pump fluid stream 44 returning from the third exchanger 36. The cold high pressure heat-pump fluid stream 43 exiting exchanger 20 is divided into two parts. The first part of this stream, typically 2-10% of the total stream, enters exchanger 36 as stream 42 where it is condensed against the low pressure heat-pump fluid stream 34 and pure nitrogen product stream 29 returning from distillation column 22. The stream 35 leaving exchanger 36 is expanded in a Joule-Thomson (J-T) valve 37 to an appropriate pressure as discussed below. The remaining portion of stream 43 enters a turboexpander 40 as stream 41 where it is expanded to produce a colder stream 39 exiting the turboexpander. The stream 41 is expanded to the same pressure as stream 35 so that the pressures of stream 39 and 38 are the same. The streams 39 and 38 are combined as stream 30 and enter reboiler 23 at the bottom of distillation column 22.

In the reboiler, stream 30 is condensed against the reboil vapors leaving the reboiler. The condensed heat-pump fluid stream 31 exiting reboiler 23 is then expanded in a Joule-Thomson valve 32 to yield an even colder low pressure heat-pump fluid stream 33. This latter stream is passed to a condenser 25 where it is used to condense part of the overhead nitrogen product stream 27 leaving the distillation column which divides into reflux stream 28 and nitrogen product stream 29. The reflux stream 28 stream comprising essentially pure nitrogen is condensed in condenser 25 and returned to the distillation column 22 as reflux stream 26.

The composition and pressure of stream 30 are chosen in such a way that it condenses against the reboil vapors in reboiler 23. In addition, the stream after being expanded in a J-T valve 32 should condense an appropriate amount of overhead nitrogen product to provide the necessary reflux to the distillation column 22. Also, an overall energy balance across the distillation column, which takes column heat in-leak into account, must be satisfied. For a heat-pump fluid stream consisting of a 50:50 mixture of argon and nitrogen, the pressure of stream 30 may be 78.0 psia for a distillation column operating at a pressure of about 45.0 psia, and the flowrate and temperature of stream 30 may be determined by the amount of material processed in the distillation column and by the overall energy balance across the distillation column, respectively. Once stream 30 is completely characterized, the pressure of the high pressure heat-pump fluid stream 49 may be determined by making an overall plant energy balance.

Both the low pressure heat-pump fluid stream 34 leaving the distillation column overhead condenser 25 and the uncondensed portion of nitrogen product stream 29 are warmed in third heat exchanger 36, second heat exchanger 20 and first heat exchanger 14, respectively, in order to recover their refrigeration. The nitrogen product stream is sent via stream 46 to storage, a nitrogen liquefaction plant, or delivered to an industrial user. The low pressure heat-pump fluid stream after being warmed up in exchangers is compressed in compressor 48 and used in the aforementioned heat-pump refrigeration circuit. In addition to the overhead pure nitrogen product stream mentioned before, the distillation column 22 concurrently produces an aforementioned liquid crude argon stream 24 as the bottoms product. This stream may be further purified to produce pure argon in equipment (not shown) such as a conventional DeOxo unit.

EXAMPLE 1

This example illustrates the low temperature PSA used in Applicant's argon and nitrogen coproduction process. In contrast with ambient temperature PSA, relatively longer cycle times are needed for the low temperature PSA. Also, since the gases adsorb much more strongly at low temperature, vacuum regeneration is essential for low temperature PSA. For the low temperature PSA discussed in this example, an adsorption pressure of 36.0 psig, a desorption pressure of 100 mbar, and an operating temperature of 0° F. was used. A 3-bed PSA employing a mixture of aforementioned Kuraray CMS, 2 mm+40-60 mesh, was used.

The complete cycle for this low temperature PSA is shown in Table I below. In each half of this cycle (separated by the dotted line in the Table), one of the primary beds (bed A or B) is first pressurized (step a or h) and then set to produce nitrogen product. During this time, the other primary bed undergoes regeneration by either atmospheric or vacuum venting (steps b and c or i and j). Subsequently, while the first primary bed continues to produce, the secondary bed (bed C) is regenerated through the primary bed undergoing regeneration (step d or k). For part of each half cycle, the product from the first primary bed is passed through the secondary bed (bed c) for further purification, while the other primary bed continues to be regenerated by vacuum venting (step e or l). After the end of production in each half cycle, pressure equalization between the secondary bed and the regenerated primary bed is effected and then the pressure equalization between the primary beds is effected.

In comparison with ambient temperature PSA, where a total cycle time of 4 to 8 min. will normally be used, the cycle time for this low temperature PSA is 2 to 4 times longer. For the conditions discussed in this example, a nitrogen yield of 55% and an argon yield of 70% for a product containing 0.1% oxygen was obtained.

TABLE I

| FULL CYCLE SEQUENCE FOR 3-BED LOW TEMPERATURE CARBON MOLECULAR SIEVE PSA | | |
|---|---|---|
| Step Bed A | Bed B | Typical Time (sec) |
| a   Pressurize | Vent to atm. | 14 |
| b   Produce nitrogen product | Vent to atm. | 100 |
| c   Produce nitrogen product | Vent through the vacuum pump | 40 |
| d   Produce nitrogen product | Vent Bed C through Bed B under vacuum | 80 |
| e   Purify nitrogen product through Bed C | Vent through the vacuum pump | 240 |
| f | Pressure equalize with Bed C | 2 |
| g   Pressure equalize with Bed B | Pressure equalize with Bed A | 4 |
| h   Vent to atm. | Pressurize | 14 |
| i   Vent to atm. | Produce nitrogen product | 100 |
| j   Vent through the vacuum pump | Produce nitrogen product | 40 |
| k   Vent Bed C through Bed A under vacuum | Produce nitrogen product | 80 |
| l   Vent through the vacuum pump | Purify nitrogen product through Bed C | 240 |
| m   Pressure equalize with Bed C | | 2 |
| n   Pressure equalize with Bed B | Pressure equalize with Bed A | 4 |
| | | 16.0 |

TABLE I-continued
FULL CYCLE SEQUENCE FOR 3-BED LOW TEMPERATURE CARBON MOLECULAR SIEVE PSA

| Step | Bed A | Bed B | Typical Time (sec) |
|------|-------|-------|--------------------|
|      |       |       | min/cycle          |

EXAMPLE 2

Typical pressure, temperature and composition of various process streams for Applicant's argon and nitrogen coproduction process are illustrated in this example and are listed in the accompanying Table II. The stream numbers correspond to the sole FIGURE. Only compositions of nitrogen, oxygen and argon in various streams are shown. Other components such as carbon dioxide and water may be present in small amounts in some of the streams. This example is for the case in which the feed air is compressed to a pressure of 49.0 psia and the low temperature PSA is operated at a temperature of 0° F. The nitrogen product leaving the distillation column is at a pressure of 44.0 psia while the crude argon product leaving the distillation column is a saturated liquid. A total of 40 theoretical distillation column trays produce nitrogen and argon products whose compositions are listed in the accompanying Table II.

TABLE II
TYPICAL PROCESS STREAM CONDITIONS FOR THE ARGON AND NITROGEN COPRODUCTION PROCESS
($N2$ = NITROGEN, $O2$ = OXYGEN and $Ar$ = ARGON)

| STREAM NUMBER | STREAM NAME | STREAM STATE | STREAM COMPOSITION | STREAM TEMPERATURE (Deg. F) | STREAM PRESSURE (PSIA) |
|---|---|---|---|---|---|
| 1 | Feed air | Superheated vapor | 0.781 N2<br>0.209 O2<br>0.010 Ar | 80.0 | 14.7 |
| 5 | Compressed feed leaving aftercooler 4 | Superheated vapor | 0.781 N2<br>0.209 O2<br>0.010 Ar | 80.0 | 49.0 |
| 13 | PSA waste | Superheated vapor | 0.648 N2<br>0.348 O2<br>0.004 Ar | 77.0 | 15.0 |
| 15 | Cold feed to PSA unit 17 | Superheated vapor | 0.781 N2<br>0.209 O2<br>0.010 Ar | 0.0 | 47.0 |
| 16 | Cold nitrogen PSA waste | Superheated vapor | 0.648 N2<br>0.348 O2<br>0.004 Ar | −5.0 | 5.0 |
| 18 | Nitrogen product from low temperature PSA | Superheated vapor | 0.981 N2<br>0.018 Ar<br>0.001 O2 | 5.0 | 46.0 |
| 21 | Nitrogen PSA product leaving exchanger 20 | Superheated vapor | 0.981 N2<br>0.018 Ar<br>0.001 O2 | −296.8 | 45.0 |
| 24 | Crude argon product leaving distillation column 22 | Saturated liquid | 0.00132 N2<br>0.05513 O2<br>0.94355 Ar | −281.0 | 44.0 |
| 26 | Pure nitrogen product leaving reflux condenser 25 | Saturated liquid | 0.99908 N2<br>0.000001 O2<br>0.000919 Ar | −301.2 | 44.0 |
| 27 | Overhead vapors leaving distillation Column 22 | Saturated vapor | 0.99908 N2<br>0.000001 O2<br>0.000919 Ar | −301.2 | 44.0 |
| 28 | Pure nitrogen product entering reflux condenser 25 | Saturated vapor | 0.99908 N2<br>0.000001 O2<br>0.000919 Ar | −301.2 | 44.0 |
| 29 | Pure nitrogen product entering exchanger 36 | Saturated vapor | 0.99908 N2<br>0.000001 O2<br>0.000919 Ar | −301.2 | 44.0 |
| 30 | High pressure heat-pump fluid entering condenser 23 | Vapor-liquid mixture | 0.50 N2<br>0.50 Ar | −276.8 | 78.0 |
| 31 | High pressure heat-pump fluid entering J-T valve 32 | Vapor-liquid mixture | 0.50 N2<br>0.50 Ar | −280.6 | 78.0 |
| 33 | Low pressure heat-pump fluid entering condenser 25 | Vapor-liquid mixture | 0.50 N2<br>0.50 Ar | −310.4 | 18.0 |
| 34 | Cold low pressure heat-pump fluid entering exchanger 36 | Saturated vapor | 0.50 N2<br>0.50 Ar | −306.4 | 18.0 |
| 35 | Heat-pump fluid stream leaving | Subcooled liquid | 0.50 N2<br>0.50 Ar | −280.7 | 100.0 |

TABLE II-continued
TYPICAL PROCESS STREAM CONDITIONS FOR THE ARGON AND NITROGEN COPRODUCTION PROCESS
(N2 = NITROGEN, O2 = OXYGEN and Ar = ARGON)

| STREAM NUMBER | STREAM NAME | STREAM STATE | STREAM COMPOSITION | STREAM TEMPERATURE (Deg. F) | STREAM PRESSURE (PSIA) |
|---|---|---|---|---|---|
| 38 | Heat-pump fluid stream leaving J-T valve 37 | Saturated liquid | 0.50 N2 0.50 Ar | −280.7 | 78.0 |
| 39 | Heat-pump fluid stream leaving turboexpander 40 | Vapor-liquid mixture | 0.50 N2 0.50 Ar | −276.7 | 78.0 |
| 43 | High pressure heat-pump fluid stream leaving exchanger 20 | Superheated vapor | 0.50 N2 0.50 Ar | −269.7 | 101.0 |
| 44 | Low pressure heat-pump fluid stream leaving exchanger 36 | Superheated vapor | 0.50 N2 0.50 Ar | −299.1 | 17.0 |
| 45 | Pure nitrogen product leaving exchanger 36 | Superheated vapor | 0.99908 N2 0.000001 O2 0.000919 Ar | −299.1 | 43.0 |
| 46 | Warm pure nitrogen product | Superheated vapor | 0.99908 N2 0.000001 O2 0.000919 Ar | 77.0 | 41.0 |
| 47 | Warm low pressure heat-pump fluid | Superheated vapor | 0.50 N2 0.50 Ar | 77.0 | 15.0 |
| 49 | Warm high pressure heat-pump fluid | Superheated vapor | 0.50 N2 0.50 Ar | 80.0 | 103.0 |

The foregoing and other various changes in form and details may be made without departing from the spirit and scope of the present invention. Consequently, it is intended that the appended claims be interpreted as including all such changes and modifications.

We claim:

1. A process for the coproduction of argon and nitrogen from an air stream comprising
   (i) elevating the pressure of said air stream in a compressor means;
   (ii) lowering the temperature of the compressed air stream in a first heat exchanger means;
   (iii) introducing the compressed and cooled air stream into a pressure swing adsorption unit comprising at least two adsorbent beds in order to remove oxygen and to yield a gaseous mixture comprising argon and nitrogen;
   (iv) separating the argon and nitrogen mixture by cryogenic means.

2. The process of claim 1, wherein the pressure swing adsorption unit operates at a temperature of 60° F. to −40° F.

3. The process of claim 1, wherein said adsorbent beds comprise a sieve having a lesser adsorptivity for argon and nitrogen than oxygen.

4. The process of claim 3, wherein said sieve is carbon molecular sieve.

5. The process of claim 1, wherein the air stream is compressed to a pressure of 30 to 60 psig.

6. The process of claim 1, wherein following compression, the compressed air stream is subjected to the removal of water and carbon dioxide.

7. The process of claim 6, wherein water and carbon dioxide removal occurs in a 13× molecular sieve bed.

8. The process of claim 7, wherein said molecular sieve bed is regenerated with vent gas from the said pressure swing adsorption unit.

9. The process of claim 1, comprising periodically regenerating the adsorbent beds of the pressure swing adsorption unit by venting to the atmosphere.

10. The process of claim 9, wherein subsequent to the atmospheric venting the beds are further regenerated by lowering the bed pressure with a vacuum pump.

11. The process of claim 9, wherein the vent gas from each of the adsorbent beds is returned through said first heat eschanger means.

12. The process of claim 1, further comprising introducing said gaseous mixture comprising argon and nitrogen into a second heat exchanger means to provide further cooling.

13. The process of claim 1, wherein said cryogenic means is a distillation column.

14. The process of claim 13, wherein said distillation column is refrigerated by a heat-pump fluid stream which is successively passed through a compressor, said first heat exchanger means and a second heat exchanger means, to cool said heat-pump fluid stream.

15. The process of claim 14, wherein subsequent to passing through said second heat exchanger means a portion of said heat-pump fluid stream is condensed in a third heat exchanger means.

16. The process of claim 15, wherein the condensed heat-pump fluid is subsequently expanded in a Joule-Thomson means.

17. The process of claim 15, wherein the remaining portion of the said heat-pump fluid stream exiting said second heat exchanger means is expanded in a turboexpander means to provide further cooling.

18. The process of claim 17, wherein said heat-pump fluid streams are combined and condensed in the reboiler tubes of said distillation column.

19. The process of claim 18, wherein the condensed heat-pump stream is passed through a second Joule- Thomson means to expand and further cool said heat-pump fluid.

20. The process of claim 19, wherein the expanded and cooled heat pump fluid is passed to a condenser, and wherein a portion of the overhead vapor product of said distillation column is condensed in said condenser.

21. The process of claim 20, wherein subsequent to said condenser, said heat-pump fluid is passed successively through said third, second, and first heat exchanger means to provide refrigeration to other process streams prior to returning to said compressor means.

22. The process of claim 20, wherein the uncondensed portion of said overhead vapor product of said distillation is passed successively through said third, second and first heat exchanger means to recover its refrigeration.

23. The process of claim 13, wherein a liquid crude argon product is recovered as bottoms of said distillation column.

24. A process for the coproduction of argon and nitrogen comprising
 (i) elevating the pressure of air in a compressor means;
 (ii) lowering the temperature of the compressed air in a first heat exchanger means;
 (iii) introducing the compressed and cooled air into a pressure swing adsorption unit comprising at least two adsorbent beds to remove oxygen and to yield a gaseous mixture comprising argon and nitrogen;
 (iv) introducing said argon and nitrogen mixture from said pressure swing adsorption unit into a second heat exchanger means to further cool said gases;
 (v) separating the argon and nitrogen mixture in a distillation column;
 (vi) refrigerating said distillation column with a heat-pump fluid stream which is successively passed through a compressor, said first heat exchanger means, said second heat exchanger means, a first Joule-Thomson means, and a turboexpander means to cool said heat pump stream;
 (vii) condensing said cooled heat-pump fluid stream in reboiler tubes of said distillation column;
 (viii) expanding and cooling the heat-pump fluid stream condensate in a second Joule-Thomson means;
 (ix) passing the heat-pump fluid successively through a third heat exchanger means, said second, and said first heat exchanger means to provide refrigeration prior to returning to said compressor means; and
 (x) passing the gaseous overhead product from said distillation column through said third, second and first heat exchanger means to recover its refrigeration.

25. The process of claim 24, wherein said expanded and cooled heat-pump fluid is passed to a condenser, where a portion of the overhead vapor of said distillation column is condensed.

* * * * *